July 2, 1935.  H. J. KRAMER  2,006,461
LOCK BOLT
Filed July 17, 1934
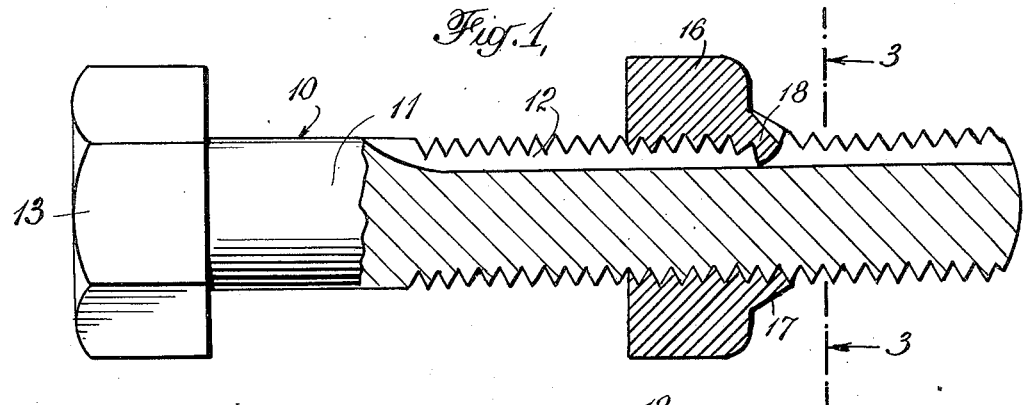
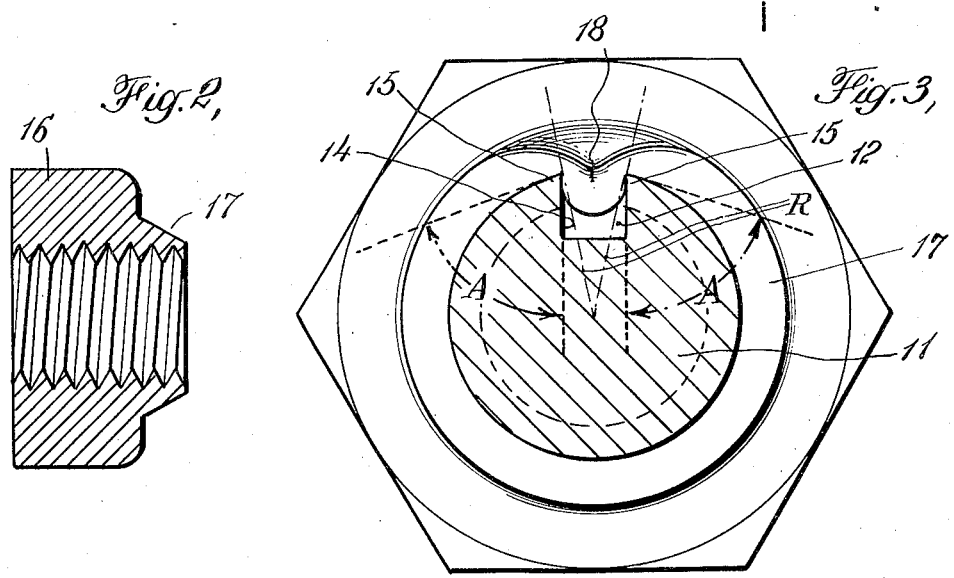
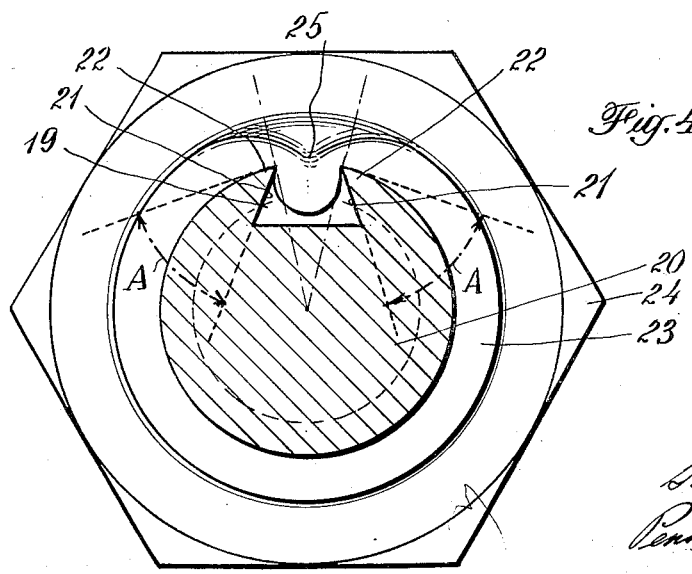
INVENTOR
Henry J. Kramer
BY
Pennie, Davis, Marvin & Edmonds
ATTORNEYS Patented July 2, 1935

2,006,461

UNITED STATES PATENT OFFICE 2,006,461

LOCK BOLT

Henry John Kramer, Memphis, Tenn.

Application July 17, 1934, Serial No. 735,588

3 Claims. (Cl. 151—21)

This invention relates to lock bolts and has particular reference to bolts in which a portion of the nut is distorted into interlocking cooperation with a corresponding portion of the shank of the bolt.

Various forms of interlocking nut and bolt arrangements have been devised heretofore, but these earlier arrangements either require the use of an additional part such as a cotter pin, lock washer or the like, and are therefore objectionable, or, if the bolt and nut are adapted to be locked together by distortion of some portion of either, the lock does not remain secure under severe operating conditions, and the nut eventually works loose.

I have found by a series of experiments and tests in actual railroad service that it is necessary to provide more than a simple interlock between the nut and bolt by distortion of one or the other; an actual extrusion or flowing of the metal of one of the parts such as the nut, over a sharp edge in the other part, which prevents rotative movement between them in both directions, is necessary to provide an interlock between them, which is sufficiently secure to remain unchanged after long periods of most severe service. Accordingly, I have devised a lock bolt in which the nut is locked in the bolt against turning movement in both directions by extruding a portion of it by means of a sharp blow over two substantially oppositely-directed sharp edges on the bolt after the nut has been screwed home.

In the preferred embodiment of the new lock bolt of this invention, the threaded shank of the bolt is provided with a longitudinal slot or groove of such shape that two parallel, sharp, substantially oppositely-directed edges are formed, one between each wall of the slot and the corresponding threaded surface of the bolt shank which form an angle of less than 90° and consequently a sharp knife-like edge between each other. In order to secure an edge of such sharpness, the bolt slot or groove is provided with substantially parallel walls or with inwardly diverging or undercut walls. The nut is formed with a relatively thin, soft metal collar or flange, which is threaded to increase the surface contact between the nut and bolt shank, and which is adapted to be struck a sharp blow with a suitable blunt tool immediately over the bolt slot or groove, after the nut has been tightened or screwed home, so that the metal of the nut collar or flange is not only distorted into the bolt slot or groove, but is extruded in both directions over the two oppositely-directed sharp knife-like edges of the bolt shank. Accordingly, rotational movement of the nut in either direction is thereafter impossible, and the nut is permanently locked in place.

For a more complete understanding of the invention, reference may be had to the accompanying drawing, in which:

Fig. 1 is a side view of the new lock bolt of this invention shown in partial section;

Fig. 2 is a cross-section of the nut;

Fig. 3 is an enlarged cross-section through the lock bolt as seen along the lines 3—3 of Fig. 1; and Fig. 4 is a similar view of a modified form of the lock bolt.

Referring to this drawing, numeral 10 designates a conventional bolt, the threaded shank of which is provided with the longitudinal slot or groove 12, which preferably terminates at some point between the head 13 of the bolt and the end of the shank threads.

As is illustrated in Fig. 3, the cross-sectional shape of the slot or groove 12 is rectangular. That is, the opposite walls 14 thereof are substantially parallel. Because of the parallel relation of the opposite walls 14 of the slot or groove 12 the angle A formed between each of these walls 12 and the corresponding surface of the shank 11 is an acute angle, being less than 90°, so that two sharp-knife like edges 15 are formed lengthwise of shank 11. These edges 15 also oppose each other, being located at opposite sides of the slot or groove 12.

Considering the formation of the sharp edges 15 in another way, it will be observed that there are less than 90° for the reason that the opposite walls 14 of the slot or groove 12 lie outside of the radii R of the shank section which lead from the edges 15.

If desired the shank 11 of the bolt 10 may be hardened so that the sharp edges 15 will be harder than the material from which the nut 16 is made.

The nut 16 is illustrated in section Fig. 2 and may be of conventional design except for the provision of a collar or flange 17 which is threaded to increase the contacting surface between the nut 16 and the shank 11 of the bolt 10. The collar or flange 17 is relatively thin and of soft metal so as to be readily distorted.

In utilizing the new lock bolt of this invention, the bolt 10 is applied in the usual way, the nut 16 being screwed home or tightened. After the nut 16 has been tightened to the proper degree, a blunt tool is placed against the collar or flange 17 opposite the slot or groove 12 in the shank 11 and struck a sharp blow so as to distort that portion 18 of the collar or flange 17 into the slot or groove 12 in the manner illustrated in Figs. 1 and 3. Due to the sharpness of the knife-like edges 15, the soft metal of the flange or collar 17 of the nut 16 is not only forced into the slot or groove 12 but the metal is extruded over both sharp edges 15, the metal flowing to either side thereof. Both edges, 15, because of their sharpness, accordingly bite into the metal of the flange or collar 17 of the nut 16.

It will be observed that the right hand sharp edge 15 effectively opposes rotational movement of the nut 16 in a clockwise direction, as seen in Fig. 3, while the left hand edge 15, being opposed to the right hand edge 15, effectively prevents rotational movement of the nut 16 in a counter clockwise direction, as seen in Fig. 3. Thus, with the new lock bolt of this invention the nut is not only prevented from turning off the threaded shank of the bolt 12 because of vibrational or other forces to which it may be subjected, but it is also prevented from working loose by turning in the opposite direction, which takes place in some instances, especially where the parts clamped by the bolt wear or compact in some way.

Accordingly, the nut 16 is locked against rotational movement in either direction and cannot work loose even under the most severe operating conditions. For example, the new lock bolt has been tested with great success by utilizing it to secure the fish plates of a railroad to the ties on a sharp curve where such severe strains are imposed on the nut as would ordinarily result in its working loose in time, either by turning off under the vibration and severe strain or by turning in the reverse direction under repeated pounding with the result that it works back and forth and eventually loosens sufficiently to subsequently allow the nut to turn off. Under these severe conditions the nut of the new bolt did not loosen in any way but remained tight after a long period of time.

In the modified form of the invention illustrated in Fig. 4, the elongated slot or groove 19 in the shank 20 of the bolt is formed with inwardly diverging side walls 21 so that the angle A is even less than the angle A in the form illustrated in Fig. 3, with the result that the sharpness of the knife edge 22 is accentuated. Accordingly the distortion of the flange or collar 23 of the nut 24 into the slot or groove 19 takes place as is indicated at 25, with the result that the extrusion or flowing of the soft metal over the sharp edges 22 is greater in degree and the locking action is more secure.

It will be seen that the new lock bolt of this invention provides absolute security under all working conditions and renders a simple form of locking arrangement more useful than it has been heretofore without requiring additional parts or special operations in manufacture and assembly. Although the rectangular and dovetail shaped slots or grooves 12 and 19, respectively, have been illustrated and described, it is to be understood that any other shape of slot which secures the sharp knife-like edge having an angle of less than 90° lies within the scope of this invention.

I claim:—

1. A bolt having a longitudinal slot extending along the threaded surface of the shank thereof, both opposite walls of said slot forming an angle of less than 90° with the corresponding adjacent surface of the shank to provide opposing sharp edges lengthwise of the shank, and a nut on the threaded shank of the bolt having a relatively thin collar adapted to be distorted at one point into the slot and extruded over both opposing sharp edges thereof, whereby one of said walls upon relative rotation of the nut and bolt forces the extruded portion of said collar toward the bottom of the slot.

2. A bolt having a longitudinal slot extending along the threaded surface of the shank thereof, the opposite walls of said slot being parallel and forming an angle of substantially less than 90° with the corresponding adjacent surfaces of the shank to provide opposing sharp edges extending lengthwise of the shank, and a nut on the threaded shank of the bolt having a relatively thin collar adapted to be distorted at one point into the slot and extruded over both opposing sharp edges thereof, whereby one of said walls upon relative rotation of the nut and bolt forces the extruded portion of said collar toward the bottom of the slot.

3. A bolt having a longitudinal slot extending along the threaded surface of the shank thereof, the opposite walls of said slot diverging inwardly from the surface of said shank and forming an angle of less than 90° with the corresponding adjacent surfaces of the shank to provide opposing sharp edges extending lengthwise of the shank, and a nut on the threaded shank of the bolt having a relatively thin collar adapted to be distorted at one point into the slot and extruded over both opposing sharp edges thereof, whereby one of said walls upon relative rotation of the nut and bolt forces the extruded portion of said collar toward the bottom of the slot.

HENRY JOHN KRAMER.